Dec. 11, 1962     F. R. VAN VLEET     3,068,012
MECHANICAL SEAL
Filed Oct. 8, 1959
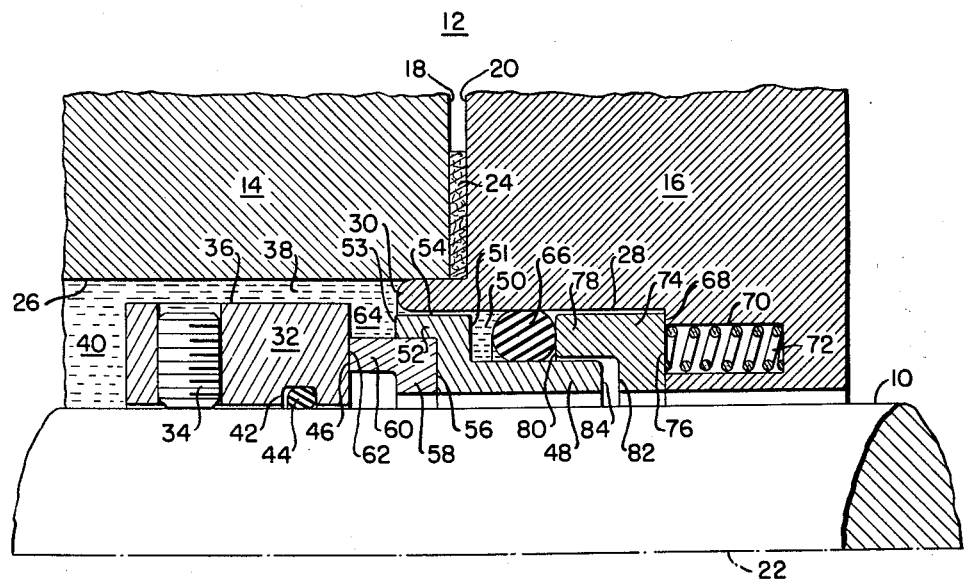
*INVENTOR.*
FRANK R. VAN VLEET
BY    KENWAY, JENNEY, WITTER & HILDRETH
ATTORNEYS United States Patent Office 3,068,012
Patented Dec. 11, 1962

3,068,012
MECHANICAL SEAL
Frank R. Van Vleet, North Reading, Mass., assignor to A. W. Chesterton Co., Everett, Mass., a corporation of Massachusetts
Filed Oct. 8, 1959, Ser. No. 845,271
14 Claims. (Cl. 277—27)

This invention relates in general to a new and improved shaft seal and in particular to a mechanical rotary shaft seal.

Basically a mechanical seal of this type consists of a pair of precision-lapped sealing faces which are urged into fluid-sealing, running contact with each other by the application of force to one or both of them. Seals of this kind are generally required to contain a pressurized fluid within one portion of an enclosure into which a rotatable shaft extends, e.g. the housing of a rotary pump. Generally speaking, the fluid-sealing force which must be applied to the sealing faces varies with the pressure of the fluid that is to be contained and may not exceed a predetermined value if excessive wear is to be prevented. In fact, the sealing force is usually kept low enough to permit the entry of a small amount of fluid between the contacting sealing faces in order to form a lubricating film between the faces which further reduces wear. Accordingly, wear of the sealing faces can occur not only as a result of the application of excessive pressure per se, but also due to the fact that the excessive pressure prevents the formation of a lubricating film between the contacting sealing faces.

The use of springs acting alone to urge the sealing faces against each other frequently results in the above-mentioned disadvantages. This is due to the fact that the spring sealing force must be sufficiently high to withstand the maximum expected fluid pressure. Where the fluid pressure is normally below its maximum, the spring force exerted on the contacting surfaces is accordingly excessive and produces wear.

The use of springs is subject to further disadvantages owing to the fact that it is extremely difficult to position the contacting spring portion in a plane which is perfectly normal to the axis of the rotating shaft. This holds true whether a number of springs spaced annularly about the shaft are employed, or whether a single spring is used which encircles the shaft. In either case, spring misalignment produces a pressure variation during each shaft rotation with the result that the wear on the contacting sealing faces is increased. Excessive wear of the sealing faces permits the compressed springs to expand and thereby aggravates the situation.

The disadvantages associated with the use of springs have been recognized and the pressurized fluid itself, which is to be contained by the shaft seal, has been employed in order to supplement the spring force. The sealing force applied by the fluid is, of course, dependent on the fluid pressure. Frequently, however, the sealing force due to fluid pressure alone is inadequate for the intended purpose. This occurs in situations where it is necessary to maintain contact of the sealing faces at low fluid pressures or in the absence of any fluid pressure whatever, e.g. where it is desired to confine the residual fluid to a certain portion of the housing. In such cases, springs are still required to maintain the necessary sealing force. As such, whether supplemented or opposed by the fluid pressure, the spring pressure in presently available rotary, mechanical shaft seals constitutes an important portion of the total sealing force and results in very rapid wear of the sealing faces which necessitates frequent repair or replacement. Quite apart from the loss of production which results from the shut-down of the affected machine, the cost of a new seal or parts thereof must be considered in this case. In addition, the labor costs of servicing or replacing the defective shaft seal, which is usually located in a relatively inaccessible portion of the machine, are high compared to the cost of the seal itself.

Accordingly, it is the primary object of this invention to provide an improved rotary, mechanical shaft seal whose contacting sealing faces are subjected to reduced wear to permit the seal to operate for long periods of time without the necessity of servicing or replacement.

The invention relates specifically to a rotary, mechanical shaft seal for containing a normally pressurized fluid within a housing which includes a pair of opposed sealing faces arranged for relative rotational movement. In accordance with the invention, the fixed force applied by at least one relatively weak spring urges the sealing faces into fluid sealing contact with each other when the fluid pressure is low or zero. The construction is such that, as normal operating conditions are approached and the force due to the pressurized fluid exceeds the fixed spring force, the spring force is neutralized and eliminated thus making the sealing engagement of the faces to be due entirely to the force applied by the pressurized fluid. The spring force is thus unable to affect the wear of the contacting faces and a seal which has superior performance characteristics is provided.

This and other objects of the invention together with further features and advantages thereof will become apparent from the following details specification when read in connection with the accompanying drawing, the single FIGURE of which illustrates a preferred embodiment of the invention.

The drawing illustrates the invention in half cross section, the remaining half having been omitted as self evident due to its symmetrical disposition about the shaft axis 22. As rotatable shaft 10 extends through a housing 12 that consists of first and second housing portions 14 and 16 respectively, of which the latter is referred to as the housing gland. The respective housing portions include a pair of mating surfaces 18 and 20 which are substantially normal to the aforesaid shaft axis 22. A flat gasket 24 is disposed between the mating surfaces to prevent fluid from entering. The housing portions 14 and 16 include a pair of interior cylindrical walls 26 and 28 respectively, having different diameters. The wall 28 terminates in a lip 30 which overlies a portion of the wall 26. A rotatable, cylindrical seal ring 32 of metal is coaxially disposed on the shaft 10 and is affixed thereto by means of at least one set screw 34 so as to rotate with the shaft. The exterior surface 36 of the seal ring 32 defines an annular space 38 with the interior housing wall 26 which is open to the pressurized fluid 40. The seal ring 32 further includes an internal, annular slot 42 which faces the shaft 10 and has a radially compressed O-ring 44 disposed therein to prevent the passage of fluid between the shaft and the seal ring 32. A precision-lapped, planar sealing face 46 which is substantially normal to the shaft axis, terminates one end of the rotatable seal ring 32.

A non-rotating, cylindrical seal ring holder 48 is coaxially disposed about the shaft 10 and defines an annular space 50 with the interior housing wall 28 of the housing gland 16. The seal ring holder includes an end surface 84 and is axially movable along the shaft while being stationary with respect to the housing gland 16 and shaft rotation. A flange 52 of the seal ring holder is disposed opposite the housing lip 30 and defines a narrow annular passage 54 with the interior housing wall 28 which opens on the annular space 50. The flange 52 is defined by a pair of opposed pressure surfaces 51 and 53 both normal to the shaft axis. The area of the pressure surface 51 exceeds that of the pressure surface 53.

The flange 52 defines a cylindrical counter bore 56 which accommodates a supplementary non-rotating seal ring 58 that is affixed to the seal ring holder and which is coaxially disposed about the shaft 10. Like the seal ring holder with which it moves, the supplementary seal ring 58 is movably in an axial direction but is stationary with respect to shaft rotation. A flange 60 of the supplementary seal ring terminates in a precision-lapped sealing face 62 which is substantially normal to the shaft axis 22 and which is adapted to maintain a running, fluid-sealing contact with the sealing face 46 of the rotatable seal ring 32. In a preferred embodiment, the area of the sealing face 62 exceeds the differential area of the opposed pressure surfaces 51 and 53. The exterior surface of the stationary seal ring 58 defines an annular space 64 with the interior housing wall 26, which connects the annular space 38 and the annular passage 54. A radially compressed O-ring 66 is disposed in the annular space 50 to prevent the passage of the pressurized fluid between the interior housing wall 28 and the stationary seal ring holder.

The housing gland 16 further includes an internal shoulder 68 substantially normal to the shaft axis. The shoulder contains a plurality of longitudinal pockets 70 annularly spaced about the shaft, each containing a relatively weak compression spring 72. A piston 74 is coaxially disposed about the shaft axis and is movable in an axial direction but stationary with respect to shaft rotation. The piston comprises a seating surface 76 which is substantially normal to the shaft axis and which is adapted to bear against the shoulder 68 at one extreme of the axial piston travel. The piston further includes a flange 78 which extends into the annular space 50 and whose contact surface 80 is adapted to bear against the O-ring 66. An interior piston surface 82 is disposed opposite the end surface 84 of the seal ring holder and contacts the latter at the other extreme of the piston travel.

In the absence of any pressurized fluid 40, or when the fluid pressure is low compared to the spring pressure, the compressive force exerted by the springs 72 on the piston seating surface 76 prevails to force the piston to the left in the drawing until the interior piston surface 82 contacts the seal ring holder surface 84. Simultaneously, the contact surface 80 of the piston bears against the O-ring 66 and pushes the latter to the left. The dimensions of the annular space 50 are so chosen that the O-ring is out of contact with the pressure surface 51 at one extreme of the piston travel when the surfaces 82 and 84 are in contact with each other and fluid can remain in, or enter, the annular space 50. The spring force which is applied to the piston 74 is transmitted to the seal ring holder 48 and to the non-rotatable seal ring 58 to force the sealing face 62 of the latter into contact with the sealing face 46 of the rotatable seal ring 32. The sealing force thus exerted to hold the two sealing faces together is sufficient to prevent the entry of fluid therebetween as long as the fluid is not under any appreciable pressure. As the fluid pressure increases to the normal operating value, the fluid in the annular space 50 forces the O-ring 66 against the contact surface 80 of the piston 78 and thereby drives the piston to the right in the drawing. The axial piston travel continues until the piston "bottoms," i.e. until its seating surface 76 is in contact with the shoulder 68. The force exerted on the piston is thus sufficient to overcome the spring compression force which continues to be exerted against the seating surface 76. It will be appreciated, however, that the spring force is now without effect on the sealing faces 46 and 62 and this condition continues as long as the forces exerted on the piston by the pressurized fluid exceeds the spring force.

The pressurized fluid further exerts a force on each of the opposed pressure surfaces 51 and 53. The net force on the seal ring holder 48 is to the left in the drawing due to the greater area of the pressure surface 51 and is proportional to the differential area of both pressure surfaces. This force is transmitted to the non-rotatable seal ring 58 where it acts to urge the non-rotatable sealing face 62 into fluid-sealing contact with the rotatable sealing face 46.

As previously explained, the area of the sealing face 62 is larger, in the preferred embodiment, than the differential area of the pressure surfaces 51 and 53. The sealing force is thus distributed over a larger area which tends to lessen the wear on the sealing faces. The area of the sealing face 62 is chosen to arrive at the proper unit pressure on the sealing face for a given fluid pressure. In a preferred embodiment, the chosen unit pressure prevents the transfer of the pressurized fluid past the sealing faces, while admitting a small amount of fluid to form a wear-reducing lubricating film.

With the rotary, mechanical seal of this invention, the spring force is completely neutralized when the fluid is under pressure and therefore cannot contribute to the wear of the sealing faces by varying the pressure during each shaft rotation. Additionally, the fluid is contained within one portion of the housing since the sealing faces are at all times in fluid-sealing contact with each other regardless of shaft rotation and irrespective of the pressure of the fluid. It will be noted that the sealing faces are urged into fluid sealing contact at all times, even during the transition period when the fluid pressure equals the spring pressure.

The invention is not, of course, restricted to the particular configuration of the preferred embodiment which is illustrated herein. For example, in place of a plurality of spring pockets annularly disposed about the shaft 10, a single, centrally located spring pocket which is constricted at one end thereof could be employed in conjunction with a single compression spring which encircles the shaft 10. Similarly, if it were desired to increase the unit pressure between the sealing faces, the area of the sealing faces 62 could be made smaller than the differential area of the pressure surfaces 51 and 53. The pressure surfaces need not, of course, be normal since the sealing force is determined by the net effective area upon which pressure is exerted in an axial direction. Similarly, the flange 52 could be extended until the surface 53 forms part of the sealing surface 62. In the latter case, the sealing force would be determined entirely by the fluid pressure exerted on the surface 51. Such a construction is practical where the stationary seal ring and the seal ring holder are integral.

The invention herein disclosed provides a rotary, mechanical shaft seal which relies on a spring force to urge a pair of sealing faces into fluid-sealing contact with each other when the fluid pressure is low or zero. Under normal operating conditions, the fluid pressure supplies the sealing force to the exclusion of the spring force, the latter being neutralized and hence ineffective to cause wear of the sealing faces.

From the foregoing disclosure of the invention it will be apparent that numerous modifications, departures and equivalents will now occur to those skilled in the art, all of which fall within the true spirit and scope of the invention.

I claim:

1. A mechanical, rotary shaft seal for containing a pressurized fluid within a portion of a housing wherein a shaft is disposed, comprising a seal ring disposed on said shaft and adapted to rotate therewith, said seal ring having a first sealing face and further including an internal groove encircling said shaft, a sealing gasket disposed in said groove adapted to prevent the passage of said fluid between said shaft and said seal ring, said seal ring defining an annular space with said housing open to said fluid, axially movable sealing means disposed about said shaft and being stationary with respect to shaft rotation, said sealing means including a second sealing face adapted to make running contact with said first sealing face to prevent the passage of said fluid therebetween, said sealing means defining a second annular space with said housing and a narrow annular passage substantially connecting said first and second annular spaces, said sealing means further including a pair of pressure surfaces disposed at opposite ends of said passage, the effective area normal to said shaft axis of one of said pressure surfaces exceeding the corresponding effective area of the other pressure surface, a second gasket disposed in said second annular space to prevent the passage of said fluid between said housing and said sealing means, said housing including a seating shoulder having at least one pocket, a spring disposed in said pocket and being of such length when compressed as to be completely enclosed in said pocket, an axially movable piston disposed about said shaft and being stationary with respect to shaft rotation, said spring being adapted to urge said piston against said sealing means when the spring pressure exceeds the fluid pressure, said piston extending into said second annular space to transmit the spring force to said second gasket, said pressurized fluid exerting a force on said second gasket in opposition to said spring force to drive said piston into solid contact against said seating shoulder and so neutralizing the pressure of the spring, the force of said fluid applied to the differential effective area of said pressure surfaces acting to urge said second sealing face into fluid-sealing contact with said first sealing face with complete absence of spring pressure.

2. A mechanical, rotary shaft seal for containing a pressurized fluid within a portion of a housing wherein a shaft is disposed, comprising first and second sealing means disposed within said housing and interiorly spaced therefrom, said first sealing means including a first sealing face adapted to rotate with said shaft, a gasket disposed between said first sealing means and said shaft to prevent the passage of said fluid therebetween, second sealing means movably disposed in the direction of the shaft axis but being stationary with respect to shaft rotation, said second sealing means including a second sealing face adapted to contact said first sealing face and further comprising opposed pressure surfaces exposed to said fluid, a gasket disposed between said second sealing means and said housing to prevent the passage of said fluid therebetween, said housing including an internal shoulder containing at least one axially extending pocket, an axially movable piston stationary with respect to shaft rotation, a spring disposed in said pocket, said spring being of such length when compressed as to be completely enclosed therein and when not so enclosed being adapted to exert an axially directed force on said piston to urge the latter against said sealing means when the spring pressure exceeds the fluid pressure, said piston being further adapted to transmit the spring force to said second gasket, the force of said pressurized fluid on said second gasket acting in opposition to said spring force to urge said piston into contact with and against said shoulder and so neutralize the action of the spring, the fluid force acting on the effective differential area of said opposed pressure surfaces acting in the absence of spring pressure to force said second sealing face into fluid-sealing contact with said first sealing face to admit sufficient fluid only to form a lubricating film between said sealing faces.

3. A rotary shaft seal for containing a pressurized fluid within a portion of housing into which a shaft extends, comprising first sealing means coaxially disposed about said shaft within said housing and interiorly spaced from the latter, said first sealing means including a first sealing surface adapted to rotate with said shaft, a first gasket disposed between said first sealing means and said shaft to prevent the passage of said fluid therebetween, second coaxially disposed sealing means interiorly spaced from said housing and including a second sealing surface, said second sealing means being movably disposed in the direction of the axis of said shaft but being stationary with respect to shaft rotation, said second sealing means including an effective presusre area normal to said axis exposed to said pressurized fluid, the fluid force on said effective pressure area being adapted to urge said second sealing surface in a first axial direction into fluid sealing contact with said rotatable first sealing surface, a second gasket disposed between said second sealing means and said housing to prevent the passage of said fluid therebetween, an axially movable piston coaxially disposed about said shaft and being stationary with respect to shaft rotation, said housing including a shoulder containing at least one pocket, a compression spring disposed in said pocket and being of such length when compressed to be totally enclosed therein, said spring when uncompressed being adapted to urge said piston resiliently against said second sealing means in said first axial direction when the fluid pressure is below a predetermined value, said fluid being adapted to force said second gasket against said piston in the opposite axial direction when said fluid pressure exceeds said predetermined value to drive said piston into engagement with said shoulder and so eliminate completely and temporarily the action of said compression spring.

4. The apparatus of claim 3 wherein said shoulder has a plurality of pockets coaxially spaced about said shaft, each of said pockets containing a compression spring adapted to bear against said piston.

5. The apparatus of claim 3 wherein said pocket consists of a bore coaxially surrounding said shaft and having a constriction at one end thereof, said spring being seated on said constriction while encircling said shaft and being adapted to bear against said piston.

6. Apparatus according to claim 3 wherein said second sealing means includes first and second opposed pressure surfaces substantially normal to the shaft axis, said second pressure surface facing said second gasket and having an area exceeding that of said first pressure surface by an amount equal to said effective pressure area.

7. Apparatus according to claim 6 wherein said effective pressure area is smaller than the area of said second sealing surface.

8. A mechanical, rotary shaft seal for containing a pressurized fluid within a portion of a housing into which a shaft extends, comprising a rotatable seal ring coaxially affixed to said shaft to rotate therewith, said rotatable seal ring being spaced from the interior walls of said housing, a radially compressed O-ring disposed between said rotatable seal ring and said shaft to prevent the passage of fluid therebetween, a stationary seal ring holder coaxially disposed about said shaft so as to be axially movable but stationary with respect to shaft rotation, said stationary seal ring holder including a flange having a pair of opposed pressure surfaces whose differential area defines a net effective pressure area responsive to axially directed fluid pressure, a stationary coaxial seal ring affixed to said seal ring holder and axially movable therewith, said rotatable and stationary seal rings being spaced from oppositely disposed interior surfaces of said housing and comprising respectively rotatable and stationary sealing faces adapted to be in running fluid-sealing contact with each other, a radially compressed O-ring disposed between said stationary seal ring holder and one of said interior housing surfaces, one side of said O-ring facing one of said presusre surfaces, a piston coaxially disposed about said shaft so as to be axially movable but being stationary with respect to shaft rotation, said piston including a flange adapted to contact the other side of said last-recited O-ring, said housing including an interior shoulder having at least one pocket, a compression spring disposed in said pocket and being of such length when compressed as to be totally enclosed therein, said spring being adapted when uncompressed to force said piston against said seal ring holder in a first axial direction in order to urge said stationary sealing face against said rotatable sealing face when the fluid pressure is below a predetermined value, said fluid being adapted to force said last recited O-ring in the opposite axial direction when said fluid pressure exceeds said predetermined value to drive said piston against said shoulder and thus neutralizing the action of the spring, the force of said fluid on said net effective pressure area being adapted to urge said stationary sealing face in said first direction into fluid-sealing contact with said rotatable sealing face and in complete absence of spring pressure.

9. A mechanical, rotary shaft seal for containing a pressurized fluid in a portion of a housing into which a shaft extends, comprising a rotatable seal ring coaxially disposed on said shaft to rotate therewith, a first annular space open to said pressurized fluid defined by said rotatable seal ring and an interior surface of said housing, said rotatable seal ring including a sealing face substantially normal to the axis of said shaft, a radially compressed O-ring disposed between said rotatable seal ring and said shaft to prevent the passage of fluid therebetween, a stationary seal ring holder coaxially disposed about said shaft and defining a second annular space with another interior surface of said housing, said seal ring holder being movably disposed in an axial direction but being stationary with respect to shaft rotation, said seal ring holder including a flange which defines a narrow annular passage with said other interior housing surface open to said second annular space, a stationary coaxial seal ring affixed to said seal ring holder so as to be axially movable therewith, said seal ring holder defining a third annular space with said first recited interior housing surface which connects said first annular space and said annular passage, said stationary seal ring including a sealing face substantially normal to said shaft axis and adapted to make running contact with said first recited sealing face, said seal ring holder flange including first and second pressure surfaces substantially normal to said shaft axis and facing said second and third annular spaces respectively, the area of said first pressure surface exceeding that of said second pressure surface, a radially compressed O-ring disposed in said second annular space out of contact with said first pressure surface, a piston coaxially disposed about said shaft and including a flange extending into said second annular space, said last recited flange having a contact surface adapted to bear against said O-ring disposed in said second annular space, said piston being axially movable but being stationary with respect to shaft rotation and further including a seating surface substantially normal to said shaft axis, said housing comprising an internal shoulder substantially normal to said shaft axis and including at least one pocket, a compression spring disposed in said pocket and being of such length when compressed as to be totally enclosed therein, said spring being adapted when uncompressed to bear against said piston seating surface and to force said piston against said seal ring holder in a first axial direction in order to urge said sealing faces into fluid-sealing contact with each other when said fluid pressure is below a predetermined value, said fluid being adapted to force the O-ring in said second annular space in the opposite axial direction against said piston contact surface when said fluid pressure exceeds said predetermined value until said piston seating surface contacts said interior shoulder thereby neutralizing the action of the spring, the force applied by said fluid on the differential area of said pressure surfaces being adapted to drive said seal ring holder in said first axial direction so as to urge the sealing face of said stationary seal ring into fluid-sealing contact with the sealing face of said rotatable seal ring and in absence of all spring pressure.

10. The apparatus of claim 9 wherein said internal housing shoulder comprises a plurality of pockets coaxially spaced about said shaft, each of said pockets containing a compression spring adapted to bear against said piston seating surface.

11. The apparatus of claim 9 wherein said pocket consists of a bore coaxially surrounding said shaft and having a constriction at one end thereof, said spring being seated on said constriction while encircling said shaft and being adapted to bear against said piston seating surface.

12. The apparatus of claim 9 wherein the area of the sealing face of said stationary seal ring exceeds the differential area of said pressure surfaces.

13. A mechanical rotary shaft seal for containing a pressurized fluid within a portion of a housing into which said shaft extends, said housing comprising first and second portions having first and second interior, cylindrical walls coaxially disposed about said shaft, said second cylindrical wall having a smaller diameter than said first cylindrical wall and including a lip portion overlying said first cylindrical wall, a rotatable cylindrical seal ring coaxially disposed on said shaft, means for affixing said seal ring to said shaft so as to rotate therewith, said seal ring including an internal, annular groove facing said shaft, a first, radially compressed O-ring disposed in said groove to prevent the passage of oil between said stationary seal ring and said shaft, the exterior surface of said seal ring defining a first annular space with said first interior housing wall open to said pressurized fluid, said seal ring including an annular sealing face substantially normal to said shaft axis, a stationary cylindrical seal ring holder coaxially disposed about said shaft and having an exterior surface which defines a second annular space with said second interior housing wall, said seal ring holder being axially movable but being stationary with respect to shaft rotation, said seal ring holder including a coaxially disposed annular flange, the exterior surface of said annular flange defining a narrow annular passage with said lip portion open to said second annular space, a coaxially disposed, cylindrical stationary seal ring fixedly positioned within said flange and axially movable with said seal ring holder, said stationary seal ring defining a third annular space with said first internal housing wall which connects said first annular space and said annular passage, said stationary seal ring including an annular flange which terminates in a second sealing face substantially normal to said shaft, said second sealing face having an area smaller than said first sealing face and being adapted to make running contact with the latter, said annular flange of said seal ring holder including first and second pressure surfaces substantially normal to said shaft axis and facing said second and third annular spaces respectively, the area of said first pressure surface exceeding that of said second pressure surface by an amount less than the area of said second sealing face, a second radially compressed O-ring disposed in said second annular space out of contact with said first pressure surface, a coaxially disposed, cylindrical piston spaced from said second cylindrical wall and including a flange extending into said second annular space, said flange having a contact surface adapted to bear against said second O-ring, said piston being axially movable but being stationary with respect to shaft rotation and further including a seating surface substantially normal to said shaft axis, said second housing portion including an internal shoulder substantially normal to said shaft axis and including at least one pocket, a compression spring disposed in said pocket and being of such length when compressed as to be totally enclosed therein, said spring being adapted when uncompressed to bear against said piston seating surface and to force said piston against said seal ring holder in a first axial direction when the fluid pressure is below a predetermined value in order to maintain said sealing faces in fluid-sealing contact with each other, said fluid being adapted to force the O-ring in said second annular space against said piston contact surface in the opposite axial direction when said fluid pressure exceeds said predetermined value until said piston seating surface contacts said interior shoulder thereby neutralizing the action of the spring, the force applied by said fluid on the differential area of said pressure surfaces being adapted to drive said seal ring holder in said first axial direction to urge said second sealing face into fluid-sealing contact with said first sealing face in the absence of all spring pressure.

14. The apparatus of claim 13 wherein said shoulder comprises a plurality of pockets coaxially spaced about said shaft, each of said pockets containing a compression spring adapted to bear against said piston seating surface.

References Cited in the file of this patent

UNITED STATES PATENTS

| | | |
|---|---|---|
| 2,128,744 | Hornschuch | Aug. 30, 1938 |
| 2,156,719 | Berger | May 2, 1939 |
| 2,470,419 | Voytech | May 17, 1949 |
| 2,503,086 | Albright | Apr. 4, 1950 |